United States Patent [19]

Foxlee

[11] Patent Number: 4,474,677

[45] Date of Patent: Oct. 2, 1984

[54] COLORED AQUEOUS ALKALIMETAL HYPOCHLORITE COMPOSITIONS

[75] Inventor: John C. Foxlee, Cilcain near Mold, Wales

[73] Assignee: Lever Brothers Company, New York, N.Y.

[21] Appl. No.: 437,389

[22] Filed: Oct. 28, 1982

[30] Foreign Application Priority Data

Nov. 6, 1981 [GB] United Kingdom ................. 8133538

[51] Int. Cl.$^3$ ...................... C09K 15/30; C11D 3/395; C11D 3/40; C11D 7/54

[52] U.S. Cl. ...................................... 252/98; 252/102; 252/186.33; 252/186.36; 252/542; 252/173; 252/DIG. 14

[58] Field of Search ............. 252/95, 98, 102, 186.36, 252/186.33, 96

[56] References Cited

U.S. PATENT DOCUMENTS 3,544,473 12/1970 Kitchen ................................ 252/99
4,271,030 6/1981 Brierley ................................ 252/98

FOREIGN PATENT DOCUMENTS 53-8604 1/1978 Japan .................................. 252/102
1508272 4/1978 United Kingdom ........... 252/186.36

*Primary Examiner*—Dennis L. Albrecht
*Attorney, Agent, or Firm*—James J. Farrell

[57] ABSTRACT

The invention pertains to colored aqueous alkalimetal-hypochlorite compositions which are suitable for bleaching purposes. By inclusion in such compositions of a halogenated metalphthalocyanine pigment having from 6 to 16 halogen atoms per molecule of phthalocyanine, the color remains stable much longer than when a metalphthalocyanine is used having from 0 to 6 halogen atoms, at an alkalimetalhypochlorite level of 5–15% by weight. Inclusion of a metal complexing agent improves the chemical stability of the colored composition. A preferred embodiment is a colored thickened alkalimetalhypochlorite composition.

7 Claims, No Drawings

COLORED AQUEOUS ALKALIMETAL HYPOCHLORITE COMPOSITIONS

The present invention relates to aqueous alkalimetal hypochlorite compositions which contain a colouring agent added thereto.

The inclusion of colouring agents in aqueous alkalimetal hypochlorite compositions has been described before. Since, however, these compositions form a strongly oxidizing environment, the choice of a colouring additive for the purpose of colouring such a composition is very limited. Thus, potassium permanganate and potassium dichromate have been described for the purpose of colouring such compositions, but the colours they impart to these compositions (purple and yellow) are aesthetically less attractive. Ultramarine Blue has been described for the purpose of colouring hypochlorite compositions, which have no appreciable yield stress value.

In Japanese Patent Application No. 8604/78, laid open to public inspection on Jan. 26, 1978, it is described to include a copperphthalocyanine pigment in aqueous hypochlorite compositions to impart a blue or blue-green colour thereto.

The copperphthalocyanines proposed contain from 0 to six halogen atoms per molecule of phthalocyanine, the copperphthalocyanines having 8 or 16 halogen atoms being unsuitable because of their high fading rate. This is demonstrated in the above Japanese patent application for compositions containing 3% of sodiumhypochlorite.

We have found that at higher sodiumhypochlorite levels, e.g. at a level of 10% by weight, the copperphthalocyanine dyes according to this Japanese patent application, containing from 0 to 6 halogen atoms, fade away rather quickly; the blue colour rapidly changes to green and/or yellow. We found, however, that the copperphthalocyanines having more than 6 halogen atoms imparted a colour to such hypochlorite compositions which remained stable for a far longer period. In view of the findings, reported in the above Japanese patent application about the instability of the colour, produced by these copperphthalocyanine dyes containing more than 6 halogen atoms, our finding was surprising and unexpected.

In its broadest aspect therefore, our invention relates to a coloured aqueous alkalimetal hypochlorite composition and a halogenated metalphthalocyanine pigment, which is characterized by the fact that the halogenated metalphthalocyanine pigment contains from more than 6 up to 16 halogen atoms per molecule of phthalocyanine, the amount of alkalimetal hypochlorite in the composition being at least 5% by weight of the composition.

The halogenated metalphthalocyanine pigments according to the present invention contain from more than 6 up to 16 halogen atoms per molecule of phthalocyanine. The halogen atom may be chlorine or bromine, or a mixture of these, chlorine being preferred. Preferred are the more fully halogenated derivatives, such as the metalphthalocyanines containing 12 or 15/16 (=fully halogenated) halogen atoms per molecule of phthalocyanine. With increasing chlorine content in the molecule, the colour of the pigment progresses from blue to green, and with increasing bromine content in the molecule the colour of the pigment progresses from blue to yellow-green.

The metal in the metalphthalocyanines can be any metal with which phthalocyanine forms a metal chelate complex, such as Cu, Ni, Mg, Pt, Al, Co, Pb, Ba, V and so on. Commercially available halogenated metalphthalocyanine pigments are the halogenated copperphthalocyanine pigments, typical representatives being Monastral Green GNS, a fully chlorinated copperphthalocyanine, identical with Monastral Fast Green G, C.I. No. 74260 ex ICI. Another commercially available halogenated pigment is Colanyl Green GG, identical with pigment green 7, ex Hoechst, also a chlorinated copperphthalocyanine.

Other examples of suitable halogenated metalphthalocyanines according to the present invention are Heliogreen K8730 ex BASF, a fully chlorinated copperphtalocyanine, Monastral Green LAG ex ICI, a partly brominated and partly chlorinated copperphthalocyanine, Monastral Green 3Y and Monastral Green 6Y ex ICI, a partly, respectively fully brominated copperphthalocyanine. All these trademarks are registered trademarks.

The metal in these halogenated metalphthalocyanines is present in a chelated form, i.e. the halogenated phthalocyanine chelates the metal in a complex form. For the purpose of the present invention the halogenated copperphthalocyanines, especially the fully chlorinated ones, have been found to be the preferred compounds to be included in the hypochlorite compositions.

According to the above Japanese patent application, the copperphthalocyanine pigments containing 0 to 6 halogen atoms do not promote decomposition of the hypochlorite. We have found, however, that such decomposition does occur when these halogenated copperphthalocyanine pigments according to this publication are used in aqueous alkalimetal hypochlorite compositions with a higher level of hypochlorite than those according to this publication.

This decomposition can be measured by measuring the amount of oxygen evolved from the hypochlorite composition, and we have found that the amount of oxygen, evolved during a certain period, is much lower when using the halogenated metalphthalocyanines of the invention than with those according to the Japanese patent application. In this respect we have found that the chemical stability of the coloured alkalimetal hypochlorite composition of the invention can be further improved by inclusion therein of metal complexing agents which are oxidation-resistant and stable in aqueous hypochlorite compositions. Typical examples of suitable complexing agents are organic hydroxy carboxylic acids such as tartaric acid, malic acid, sulphosalicylic acid, furthermore inorganic acids such as telluric acid, periodic acid; these acids may also be used in their alkalimetal salt form. Mixtures of these complexing agents can also be used.

The compositions of the present invention comprise the halogenated metalphthalocyanine pigment in an amount ranging from 0.0001 to 0.01% by weight, preferably from 0.0002 tot 0.0025% by weight.

The amount of alkalimetalhypochlorite in the compositions ranges from 5 to 15% by weight, and the amount of metal complexing agent ranges from 0.0001 to 1.0% by weight.

The aqueous alkalimetalhypochlorite composition further comprises an aqueous medium, which may contain the usual small amounts of caustic alkalies and perfumes.

Not only may the aqueous composition be an aqueous liquid composition, but also, and preferably, a thickened aqueous liquid hypochlorite solution. Such thickened compositions are known per se from U.K. Patent Specification Nos. 1,329,086; 1,466,560; 2,003,522; 2,046,21; 2,051,162; European Patent Application No. 0030401 and NL-patent application 7 605 328, all these being published specifications, and the present invention is applicable to these compositions as well. These thickened compositions comprise in the aqueous medium as thickening agent a blend of different detergent surfactants, sometimes additional electrolytes, hydrotropes, silicates etc.

The thickening agent consists of at least two different detergent active compounds of which at least one must be soluble in aqueous hypochlorite solutions. Suitable examples of such washing agents are the trialkylamine oxide according to Netherlands patent No. 148 103 or German patent No. 2 837 880; betaines according to Netherlands patent No. 148 103; and quaternary ammonium compounds according to U.S. Pat. No. 4,113,645 and Netherlands patent application No. 7605328. Mixtures of these washing agents can also be used. The other detergent active compounds present in the thickener can be alkali-metal soaps according to British Pat. No. 1,329,086, alkali-metal acylsarcosinates or -alkyltaurides according to British Pat. No. 1,466,560 or sugar esters according to Netherlands patent application No. 7605328, alkylsulphates according to British Pat. No. 2,051,162, or mixtures thereof. Alkali-metal $C_{10}$–$C_{18}$ alkylether (containing 1–10 moles of ethylene and/or propylene oxide) sulphates can also be used.

However, the mixtures of trialkylamine oxides and alkali-metal soaps of fully saturated $C_8$–$C_{18}$ fatty acids as described in British Pat. No. 1,329,086 are preferred.

The thickening agent is used in an amount of 0.5–5% by weight based on the final product.

The weight ratio of the hypochlorite-soluble detergent active substance to the other detergent active substance in the thickening agent can vary from 90:10 to 20:80.

The present invention will further be illustrated by way of example.

EXAMPLE 1

A thickened liquid hypochlorite composition of the following formulation was prepared:

| | % by weight |
|---|---|
| sodium hypochlorite | 8.70 |
| lauryldimethylamineoxide | 0.84 |
| lauric acid | 0.29 |
| sodium hydroxide | 0.49 |
| sodium silicate (100° TW) | 1.07 |
| perfume | 0.06 |
| softened water | balance |

Samples of this product were taken, to which different colouring agents and complexing agents were added. Of the products thus prepared the colour stability and the stability of the hypochlorite was measured.

The following Table represents the details of the additives, and the results obtained.

TABLE

| Colouring agent (wt. %) | Complexing agent (wt. %) | Colour Stability | Evolution of oxygen in ml/ 20 h/37° C. |
|---|---|---|---|
| (a) unhalogenated copperphthalocyanine (prior art) 0.001% | — | from blue to green to pale yellow within a few hours | visible after a few hours |
| (b) copperphthalocyanine with 4 chlorine atoms in the phthalocyanine molecule (prior art) 0.001% | — | from blue to green after a few hours. | visible after a few hours |
| (c) fully chlorinated copperphthalocyanine (invention) 0.001% | — | green colour was still unchanged after a few weeks' storage at 20° C. | 14 ml. |
| (c) fully chlorinated copperphthalocyanine (invention) 0.001% | 0.001% sodium metaperiodate | green colour was still unchanged after a few weeks' storage at 20° C. | 2 ml. |

EXAMPLE 2

Example 1 was repeated, using fully chlorinated copperphthalocyanine and sodium metaperiodate at varying levels. The following results were obtained:

| Colouring agent (wt. %) | Complexing agent (wt. %) | Visible evolution of gas at 37° C. after (days) |
|---|---|---|
| 0.001 | 0.002 | none after 10 weeks |
| 0.002 | 0.001 | none after 10 weeks |
| 0.001 | 0.001 | none after 10 weeks |
| 0.001 | 0.0005 | 35 |
| 0.001 | 0.0002 | 8 |

EXAMPLE 3

Repeating Example 1, (c), but using sodiumtellurate, or sulphosalicylic acid, or malic acid, or tartaric acid instead of sodium metaperiodate gives similar results, the tartaric acid being more effective than the malic acid, which in turn is more effective than the sulphosalicylic acid. The tellurate was as effective as the periodate.

I claim:

1. A coloured, aqueous alkalimetalhypochlorite composition comprising, in an aqueous medium, from 5 to 15% by weight of an alkalimetalhypochlorite, and from 0.0001 to 0.01 percent by weight of a halogenated metalphthalocyanine pigment, containing from more than 6 up to an including 16 halogen atoms, the halogen being chlorine, bromine, or mixtures thereof, the metal being selected from the group consisting of Cu, Ni, Mg, Pt, Al, Co, Pb, Ba and V, and the balance of the composition consisting of the aqueous medium.

2. The composition of claim 1, in which the halogenated metalphthalocyanine pigment is a fully halogenated copperphthalocyanine.

3. The composition of claim 2, in which the fully halogenated copperphthalocyanine is the fully chlorinated copperphthalocyanine.

4. The composition of claim 1, further comprising in the aqueous medium from 0.0001 to 1% by weight of a metal complexing agent selected from the group consisting of tartaric acid, malic acid, sulphosalicylic acid, telluric acid, periodic acid and the alkalimetal salts of these acids.

5. The composition of claim 4, wherein the metal complexing agent is sodiumperiodate.

6. A thickened coloured aqueous alkalimetalhypochlorite composition comprising, in an aqueous medium, from 5 to 15% by weight of an alkalimetalhypochlorite, and from 0.0001 to 0.01 percent by weight of a halogenated metalphthalocyanine pigment, containing from more than 6 up to and including 16 halogen atoms, the halogen being chlorine, bromine, or mixtures thereof, the metal being selected from the group consisting of Cu, Ni, Mg, Pt, Al, Co, Pb, Ba and V, from 0.5 to 5 percent by weight as a thickening agent a mixture of (1) a hypochlorite-soluble first detergent active compound selected from the group consisting of a tertiary amine oxide having one branched or straight $C_8$–$C_{18}$ alkyl chain and two short chain alkyl groups, $C_8$–$C_{18}$ alkyl-substituted betaines, quaternary ammonium compounds and mixtures thereof, and (2) a second detergent active compound selected from the group consisting of an alkalimetal salt of a fully saturated $C_8$–$C_{18}$ fatty acid, an alkalimetal acylsarcosinate, an alkalimetal alkyltauride, a sugar ester, an alkalimetal $C_6$–$C_{18}$ alkylsulphate, an alkalimetal $C_{10}$–$C_{18}$ alkylether sulphate containing 1–10 moles of ethylene oxide and/or propylene oxide and mixtures thereof, the weight ratio of the hypochlorite-soluble first detergent active compound to the second detergent active compound being from 90:10 to 20:80, and the balance consisting of the aqueous medium.

7. The composition of claim 6, further comprising in the aqueous medium from 0.0001 to 1% by weight of a metal complexing agent selected from the group consisting of tartaric acid, malic acid, sulphosalicylic acid, telluric acid, periodic acid and the alkalimetal salts of these acids.

* * * * *